United States Patent [19]

Alter

[11] 4,338,523

[45] Jul. 6, 1982

[54] LOW COST DISPOSABLE RADIATION DETECTING APPARATUS

[75] Inventor: H. Ward Alter, Walnut Creek, Calif.

[73] Assignee: Terradex Corporation, Walnut Creek, Calif.

[21] Appl. No.: 139,382

[22] Filed: Apr. 11, 1980

[51] Int. Cl.³ .............................................. G01T 1/04
[52] U.S. Cl. .................................. 250/472; 250/473; 428/79
[58] Field of Search ............... 250/472, 473, 474, 479, 250/484, 337; 428/77, 78, 79, 133

[56] References Cited

U.S. PATENT DOCUMENTS

| | | | |
|---|---|---|---|
| 3,509,003 | 4/1970 | Engle | 428/79 X |
| 3,612,870 | 10/1971 | Brennan | 250/472 X |
| 3,652,854 | 3/1972 | Wheeler | 250/484 |
| 3,665,194 | 5/1972 | Alter et al. | 250/472 X |
| 3,873,404 | 3/1975 | West | 428/79 X |
| 3,925,585 | 12/1975 | Aoyagi | 428/79 X |
| 4,056,729 | 11/1977 | Collica et al. | 250/472 X |
| 4,220,852 | 9/1980 | Seidel | 250/484 X |

Primary Examiner—Davis L. Willis
Attorney, Agent, or Firm—Townsend and Townsend

[57] ABSTRACT

A low cost disposable radiation detector of the track registration material type having a substrate layer with a strip of the track registration material removably attached thereto. The track registration material is removably attached to the substrate by a top layer having an aperture formed therein and at least one tab portion adjacent the aperture and bendable out of the top layer to overlap a portion of the strip of track registration material for retaining the strip in the aperture.

25 Claims, 9 Drawing Figures

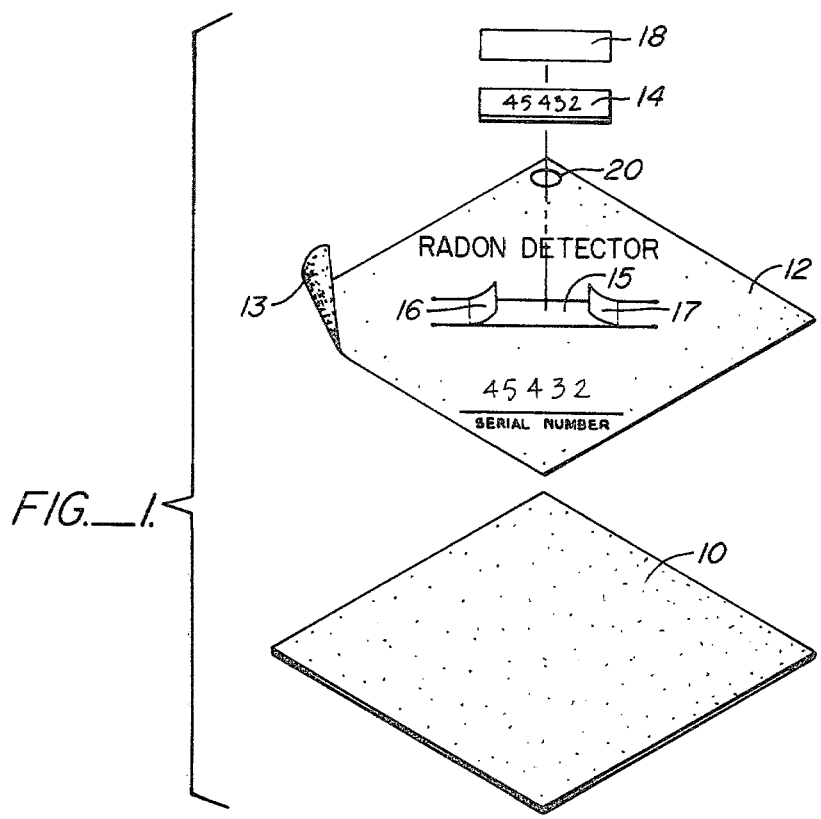
FIG._1.
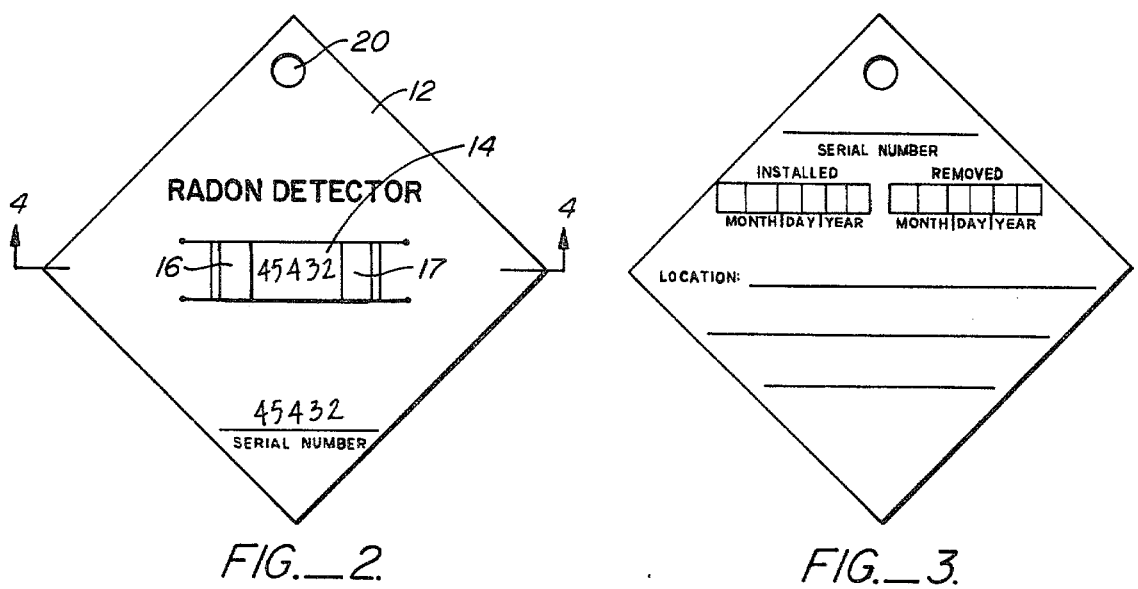
FIG._2.    FIG._3.
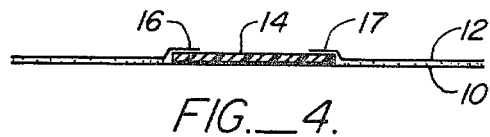
FIG._4.

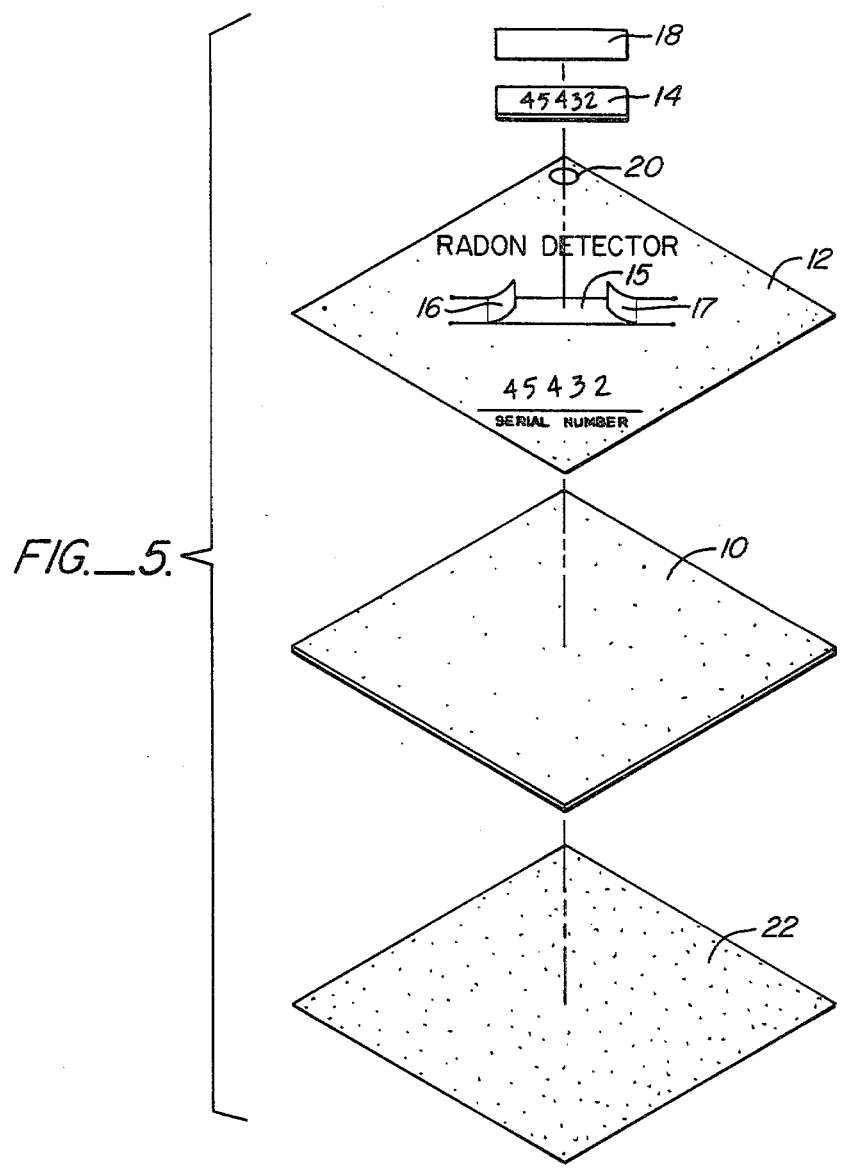
FIG._5.

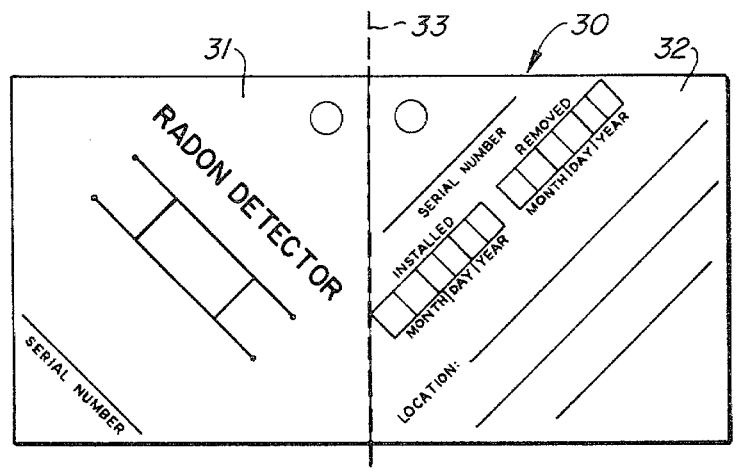
FIG._6.
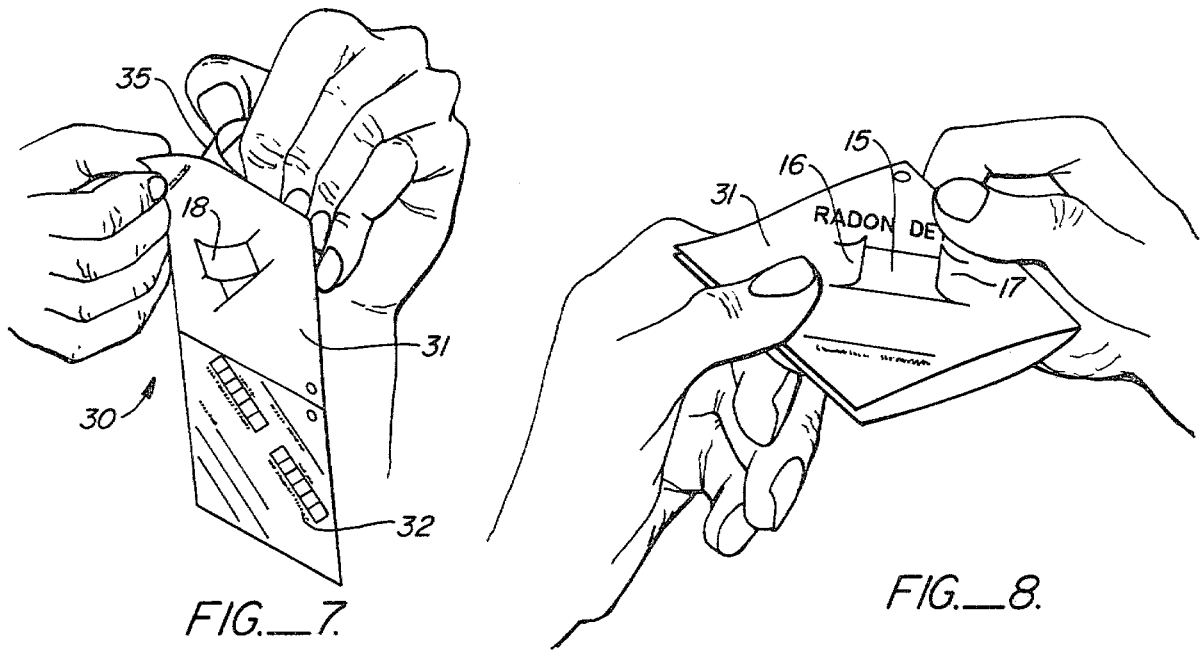
FIG._7.
FIG._8.
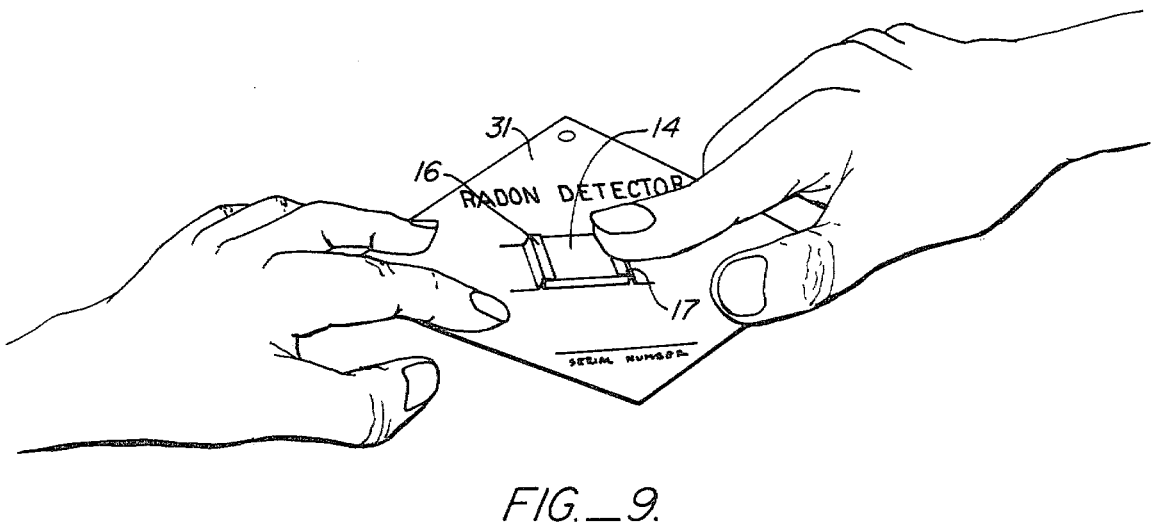
FIG._9.

LOW COST DISPOSABLE RADIATION DETECTING APPARATUS

BACKGROUND OF THE INVENTION

This invention relates to an improved apparatus for the detection of radon gas in an ambient region using a track registration material.

A known technique employed in the field of radon gas detection which has been found to be highly effective is the method and apparatus for detecting radon and alpha emitting daughters of radon disclosed and claimed in U.S. Pat. No. 3,665,194 to Alter et al. for "Radon Detection", the disclosure of which is hereby incorporated by reference. Briefly, according to this technique a strip of track registration material employed as an alpha particle detector is disposed in a protective environment at a preselected location in order to monitor the presence of radon and alpha emitting daughters of radon. If the track registration material is irradiated by alpha particles falling within a predetermined energy range, minute damage "tracks" are created therein, which tracks can be subsequently enlarged and made visible under suitable magnification by contact with a reagent to which the tracks display preferential chemical reactivity.

Typically, this radon monitoring technique is carried out by placing one or more housings each containing a strip of track registration material in locations to be monitored, such as a mine, and permitting the detectors to remain at the monitored site for a preselected period of time (e.g., several weeks). After exposure, the housings are removed, each strip of track registration material is subjected to a chemical etching solution, and the number of tracks etched on each strip is counted by microscopic inspection. The thus obtained track data is then used to compute the average radon concentration in the monitored site.

While the above described technique has been primarily employed in the past for uranium prospecting applications, recently other applications have been increasingly pursued, albeit primarily on an experimental basis. For example, this technique has been used to measure radon anomalies in earthquake prone areas, to measure radon levels in housing structures located in regions suspected of exhibiting abnormal levels of radon concentration, and as a personal dosimeter to measure the degree of exposure of personnel employed in certain occupations. Recently, increasing interest has been expressed in the monitoring of radon concentration levels within enclosed structures, such as homes, offices and the like, necessitating the preparation of extremely large numbers of track registration type detectors. The most popular, readily available model of such a detector comprises a housing resembling a plastic drinking cup and a strip of track registration material adhered to the inside bottom surface of the cup at a prescribed distance away from the mouth of the cup in order to avoid physical contact with solid particles potentially containing radioactive materials not of interest in a radon survey. These cup detectors, while eminently suitable for ground surveys, are not ideally suited to structural surveys, both from a functional standpoint as well as an aesthetic standpoint. Functionally, the cup must be attached to a wall of the structure or suspended from the ceiling, each of which is at best awkward. The adverse aesthetic effects are deemed obvious. These functional and aesthetic disadvantages are exacerbated by the fact that the detector must be left in place for a prolonged period of time, e.g., three months.

SUMMARY OF THE INVENTION

The invention comprises a low cost, disposable radiation detector of the track registration material type which occupies a minimum of space, can be easily assembled with no special technical skill, and emplaced conveniently anywhere on or adjacent a structural panel, and which provides reliable results comparable to those afforded by more bulky and expensive detectors of this type.

In its broadest aspect, the detector comprises a substrate layer having a support surface, a strip of track registration material having the property of forming damage tracks therein along paths traversed by alpha particles, and a top layer adhered to the substrate layer and cooperative therewith for removably securing the strip to the substrate layer. The top layer has an aperture formed therein in a predetermined location and at least one tab portion adjacent the aperture bendable out of the plane of the top layer and overlapping a portion of one end of the strip of track registration material for retaining the strip in the aperture. In one embodiment of the detector, the top layer is fabricated from a sheet of flexible material, and the surface of the top layer facing the substrate layer, including the tab portion, is provided with an adhesive material. In another embodiment, the top layer is fabricated from a sheet of flexible material, and the substrate layer support surface is provided with an adhesive material. The substrate layer is alternately formed from a thin sheet of flexible material or a sheet of relatively inflexible material. In another alternate embodiment, the substrate layer is formed from a sheet of relatively inflexible material, and an additional flexible backing layer is adhered to the reverse surface of the substrate layer.

In the preferred embodiment of the invention, the substrate layer and the top layer are formed from a unitary blank folded about a predetermined line portion extending transversely of the blank, the blank including an adhesive reverse surface layer forming the support surface and the adhering surface of the top layer after the blank has been folded.

In all embodiments of the invention, the aperture has a geometrical shape substantially coextensive with the perimeter of the strip of track registration material so that the strip is exposed directly to ambient, with the exception of the small portion of the strip overlapped by the tab portion. In embodiments employing a rectangular strip of track registration material, the aperture is likewise rectangular, the length and width of the strip being substantially equal to the length and width of the aperture, respectively. Preferably, the top layer includes first and second tab portions at first and second ends of the aperture so that the first and second tab portions overlap flanking ends of the strip of track registration material. In addition, in all embodiments, the exposed surfaces of the detector are preferably provided with indicia identifying the strip of track registration material, the site location, the date of installation, and the date of removal.

The detector is generally fabricated by one of two alternate methods, depending on the specific embodiment desired. In those applications in which the detector is fabricated from a unitary blank, the method proceeds by providing such a blank comprising a sheet of flexible material having an obverse surface and a reverse surface, an adhesive layer adhered to the reverse surface, and a protective cover sheet removably adhered to the adhesive layer. The protective cover sheet is removed to expose the adhesive layer, and the sheet is folded about a predetermined line portion thereof to mutually adhere mating portions of the reverse surface so as to form an unfinished article having a top surface and a bottom surface. A portion of this sheet is removed from a predetermined region of the top surface to define the track registration strip aperture, and one or more tab portions adjacent associated edges of the aperture are raised out of the plane of the sheet. The track registration material is placed in the aperture, and each tab portion is lowered toward the plane of the sheet until the adhesive surface of each tab portion contacts an associated end portion of the exposed surface of the track registration material. The steps of folding and removing can alternately be reversed. In addition, the step of removing the aperture defining sheet portion, as well as the step of raising the tab portion out of the plane of the sheet, are preferably facilitated by prescoring the sheet to define the aperture and the tab portion.

In those applications in which the detector is fabricated from individual elements, the method proceeds by providing a substrate, either flexible or inflexible, having a support surface and adhering a top layer to the support surface. A portion of the top layer is removed to define the track registration strip aperture, and one or more tab portions adjacent associated edges of the aperture are raised out of the plane of the sheet. The track registration material is placed in the aperture, and each tab portion is lowered toward the plane of the sheet until an adhesive surface of each tab portion contacts an associated end portion of the exposed surface of the track registration material. The top layer is preferably prescored in order to define the aperture and the tab portions. In an alternate embodiment, a separate bottom layer is adhered to the reverse surface of the substrate.

Detectors fabricated according to the invention can be easily emplaced on or adjacent a structural panel of a building or the like in a variety of ways, such as by hanging the detector on a nail, suspending the detector by means of a string, by taping the detector to a wall, gluing the detector to a panel, or in any other suitable fashion. Since the assembled detectors are essentially flat, these devices can be easily shipped in cartons at relatively low cost and returned to the supplier of later processing after exposure over the preselected monitoring interval, which is typically three months. The detectors are also extremely low in cost, since they are fabricated from extremely inexpensive materials, such as paper, cardboard, plastic or the like.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an exploded view of a first embodiment of the invention;

FIG. 2 is a plan view of the top surface of the embodiment of FIG. 1;

FIG. 3 is a plan view of the reverse surface of the embodiment of FIG. 1;

FIG. 4 is a sectional view taken along lines 4—4 of FIG. 2;

FIG. 5 is an exploded view of an alternate embodiment of the invention;

FIG. 6 is a top plan view of an alternate embodiment of the invention employing a unitary blank; and FIGS. 7-9 are sequential views illustrating fabrication of the unitary blank embodiment of the invention.

DESCRIPTION OF THE PREFERRED EMBODIMENTS

Turning now to the drawings, FIGS. 1-4 illustrate a first embodiment of the invention. As seen in FIG. 1, the detector comprises a substrate 10, a top layer 12, and a strip of track registration material 14. The substrate 10 is fabricated from either a relatively flexible sheet or a relatively inflexible (stiff) sheet of suitable material, such as paper, cardboard, sheet vinyl or the like. Top layer 12 is preferably fabricated from a relatively flexible, thin sheet material, such as paper, sheet plastic or the like. As depicted in FIG. 1, top layer 12 is provided with an adhesive substance 13 on the reverse surface thereof facing the top surface of substrate 10. Alternatively, adhesive layer 13 may be applied to the top surface of substrate 10.

The strip track registration material 14 is secured in place in an aperture 15 formed in top layer 12 by means of bendable tab portions 16, 17 provided with an adhesive substance on the reverse surface thereof (FIG. 4).

In order to define the aperture 15 and the bendable tabs 16, 17, top layer 12 is preferably prescored to provide a removable central rectangular portion 18 and tab portions 16, 17.

The detector of FIGS. 1-4 is assembled by adhering top layer 12 to substrate 10, removing portion 18, bending tab portions 16, 17 out of the plane of top layer 12, placing the detector strip 14 into the aperture 15 and pressing the tab portions 16, 17 back down onto the top surface of strip 14. To facilitate emplacement of the assembled detector, a hole 20 is punched in the top corner so that the assembled detector may be supported by a small nail driven into a support panel, such as the wall of a house.

As seen in FIGS. 2 and 3, the obverse and reverse surfaces of the detector are preprinted with indicia for the entry of information serving to identify the detector (serial number), the date of installation, the date of removal, and the location of the specific site monitored by a particular detector.

In use, after assembly, the track registration strip 14 is marked with an identifying serial number, and this number is repeated on the detector obverse and reverse surfaces. The detector is then shipped to the user for emplacement, and the user enters the installation date and location. After the predetermined monitoring period (approximately three months) has elapsed, the user enters the date of removal, and ships the detector back to the supplier for processing of the track registration strip. After processing, the radiation level data results are furnished to the user.

FIG. 5 illustrates an alternate embodiment of the invention in which the substrate 10 is illustrated as a relatively inflexible member, and in which an additional reverse flexible layer 22 is provided. Although not shown in FIG. 5, the hidden surface of layer 22 is preprinted in a manner similar to that illustrated in FIG. 3.

FIGS. 6-9 illustrate an alternate embodiment of the invention in which the detector is fabricated from a unitary blank 30 preprinted on one surface in the manner indicated in FIG. 6. Blank 30 consists of two half portions 31, 32 which, when folded about line segment 33, form the top and bottom surfaces of the detector, respectively. Blank 30 is provided with an adhesive backing layer covered by a protective cover sheet 35 partially illustrated in FIG. 7.

To assemble the detector, the protective cover sheet 35 is peeled away from the adhesive backing layer, and the central portion 18 is removed. The blank is folded about the line segment 33, and the two half portions 31, 32 are pressed together as shown in FIG. 8. The bendable tab portions 16, 17 are raised out of the plane of the top surface portion 31, the strip of track registration material 14 is placed in the aperture 15 and the tab portions 16, 17 are pressed down onto the top edge surfaces of strip 14 to complete the detector. The use of the detector of FIGS. 6–9 is essentially identical to that described above for the embodiments of FIGS. 1–5.

As will now be apparent, radon detectors fabricated according to the invention are extremely inexpensive to produce, with no special technical expertise being required for fabrication. In addition, such detectors, being essentially flat, can be conveniently shipped in large quantities using standard cartons from a central distribution point (the supplier) to a distributor. At the distribution point, individual detectors can be directly mailed to the individual users, or personally distributed by commercial representatives of the distributor, by a government employee (such as a postal employee), by a utility company employee, or in any other convenient manner. If desired, each detector may be distributed to the end user along with a self-addressed stamped envelope to encourage return of the disposed detector for processing.

Detectors fabricated according to the invention, while extremely simple in design, are highly effective and accurate in measuring the concentration of radon gas and radon daughter products over the monitoring time interval. This is due primarily to the geometry of the detector in which the surface of the track registration material strip 14 (with the exception of the portion covered by tabs 16, 17) is directly exposed to alpha particles emitted by gases and aerosol particles in the ambient region directly in front of the detector.

While the above provides a full and complete disclosure of the invention, various modifications, alternate constructions and equivalents may be employed without departing from the spirit and scope of the invention. For example, in order to protect the track registration material strip 14 from stray radiation prior to installation and after removal, each detector may be provided with a protective envelope to shield the strip 14. Such an envelope may be fabricated from any suitable alpha particle screening material, such as glassine. Therefore, the above should not be construed as limiting the invention, which is defined by the appended claims.

What is claimed is:

1. A low cost disposable radiation detector comprising:
   a substantially flat layer providing a support surface;
   a strip of track registration material having the property of forming damage tracks therein along paths traversed by alpha particles encountering a surface thereof exposed directly to ambient; and
   a substantially flat top layer adhered to said substrate layer and cooperative therewith for removably securing said strip to said substrate layer, said top layer having an aperture formed therein in a predetermined location and at least one integral tab portion adjacent said aperture bendable out of the plane of said top layer and overlapping a portion of one edge of said strip of track registration material for retaining said strip in said aperture, said aperture having a geometrical shape substantially coextensive with the perimeter of said strip, with the exception of the edge portion of said strip overlapped by said tab portion, to provide said exposed surface.

2. The invention of claim 1 wherein said top layer is fabricated from a sheet of flexible material, and wherein the surface of said top layer facing said substrate layer, including said tab portion, is provided with an adhesive material.

3. The invention of claim 1 wherein said top layer is fabricated from a sheet of flexible material, and wherein said substrate layer support surface is provided with an adhesive material.

4. The invention of claim 1 wherein said strip and said aperture are both rectangular, the length and width of said strip being no greater than the length and width of said aperture, respectively; and wherein said top layer includes first and second tab portions at first and second ends of said aperture, said first and second tab portions overlapping first and second ends of the said strip.

5. The invention of claim 1 wherein said substrate layer is formed from a thin sheet of flexible material.

6. The invention of claim 1 wherein said substrate layer is formed from a sheet of relatively inflexible material.

7. The invention of claim 6 wherein said substrate layer includes a reverse surface, and wherein said detector further includes a backing layer adhered to the reverse surface of said substrate layer.

8. The invention of claim 1 wherein said top layer includes a surface portion reserved for the application of identifying indicia for said strip of track registration material.

9. The invention of claim 1 wherein said substrate layer includes a reverse surface having a portion reserved for the application of identifying indicia.

10. The invention of claim 1 wherein said substrate layer and said top layer are formed from a unitary blank folded about a predetermined line portion thereof.

11. The invention of claim 10 wherein said predetermined line portion extends transversely of said blank.

12. The invention of claim 10 wherein said blank includes an adhesive layer for adhering said top layer to said substrate layer.

13. A unitary blank for forming a low cost disposable radiation detector, said blank comprising a first sheet of flexible material having an obverse surface and a reverse surface, an adhesive layer adhered to said reverse surface, and a protective cover sheet removably adhered to said adhesive layer, said first sheet including a first prescored removable portion located in a predetermined region defining an aperture for receiving a strip of track registration material when said removable portion is removed, said prescored removable portion defining an aperture having a geometrical shape with a first pair of opposing edges spaced by an amount substantially equal to the width of said strip, and a second pair of opposing edges spaced by an amount less than the length of said strip, and at least one additional prescored portion defining a tab bendable out of the plane of said first sheet for overlapping a portion of one end of said strip of track registration material when installed in said aperture.

14. The invention of claim 13 wherein said aperture is rectangular.

15. The invention of claim 13 wherein said first sheet further includes first and second additional prescored portions flanking said prescored removable portion defining a pair of flanking tabs bendable out of the plane of said first sheet for overlapping opposed ends of said strip of track registration material when installed in said aperture.

16. A method of fabricating a low cost disposable radiation detector, said method comprising the steps of:
   (a) providing a unitary blank comprising a sheet of flexible material having an obverse surface and a reverse surface, an adhesive layer adhered to said reverse surface, and a protective cover sheet removably adhered to said adhesive layer;
   (b) removing said protective cover sheet to expose said adhesive layer;
   (c) folding said sheet about a predetermined line portion thereof to mutually adhere mating portions of said reverse surface so as to form an article having a top surface and a bottom surface;
   (d) removing a portion of said sheet from a predetermined region of said top surface to define an aperture therein;
   (e) raising out of the plane of said sheet a tab portion adjacent an edge of said aperture;
   (f) placing a strip of track registration material in said aperture, said track registration material having the property of forming damage tracks therein along paths traversed by alpha particles; and
   (g) lowering said tab portion toward the plane of said sheet until the adhesive surface of said tab portion contacts an end portion of the exposed surface of said track registration material.

17. A method of fabricating a low cost disposable radiation detector, said method comprising the steps of:
   (a) providing a unitary blank comprising a sheet of flexible material having an obverse surface and a reverse surface, an adhesive layer adhered to said reverse surface, and a protective cover sheet removably adhered to said adhesive layer;
   (b) removing said protective cover sheet to expose said adhesive layer;
   (c) removing a portion of said sheet from a predetermined region of said top surface to define an aperture therein;
   (d) folding said sheet about a predetermined line portion thereof to mutually adhere mating portions of said reverse surface so as to form an article having a top surface and a bottom surface;
   (e) raising out of the plane of said sheet a tab portion adjacent an edge of said aperture;
   (f) placing a strip of track registration material in said aperture, said track registration material having the property of forming damage tracks therein along paths traversed by alpha particles; and
   (g) lowering said tab portion toward the plane of said sheet until the adhesive surface of said tab portion contacts an end portion of the exposed surface of said track registration material.

18. The method of claim 16 or 17 wherein said step (e) of raising includes the step of lifting a pair of flanking tab portions out of the plane of said sheet at opposite sides of said aperture.

19. The method of claim 16 or 17 wherein said step (a) of providing includes the step of prescoring said sheet to define said aperture and said tab portion.

20. A method of fabricating a low cost disposable radiation detector, said method comprising the steps of:
   (a) providing a substrate having a support surface;
   (b) adhering a top layer to said support surface;
   (c) removing a portion of said top layer from a predetermined region to define an aperture;
   (d) raising a tab portion adjacent an edge of said aperture out of the plane of said top layer;
   (e) placing a strip of track registration material in said aperture, said track registration material having the property of forming damage tracks therein along paths traversed by alpha particles;
   (f) lowering said tab portion onto a top surface portion of said track registration material; and
   (g) adhering said tab portion to said top surface portion of said track registration material in the region of mutual contact therebetween.

21. The method of claim 20 wherein said step (a) of providing includes the step of prescoring said top layer to define said aperture and said tab portion.

22. The method of claim 20 wherein said step (d) of raising includes the step of raising flanking tab portions adjacent opposite edges of said aperture to provide a pair of flanking tab portions; and wherein said steps of (e) lowering and (f) adhering are performed with said pair of flanking tab portions.

23. The method of claim 20 further including the step of adhering a bottom layer to the reverse surface of said substrate from said support surface.

24. The method of claim 20 wherein said step (a) of providing includes the step of applying indicia on said top layer identifying said strip of track registration material.

25. The method of claim 20 wherein said step (a) of providing includes the step of applying identifying indicia on the reverse surface of said substrate from said support surface.

* * * * *